(12) United States Patent
Lu et al.

(10) Patent No.: US 9,030,161 B2
(45) Date of Patent: May 12, 2015

(54) WIRELESS POWER TRANSMISSION

(75) Inventors: Mingyu Lu, Arlington, TX (US);
Richard E. Billo, Colleyville, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 399 days.

(21) Appl. No.: 13/534,545

(22) Filed: Jun. 27, 2012

(65) Prior Publication Data
US 2012/0326660 A1 Dec. 27, 2012

Related U.S. Application Data

(60) Provisional application No. 61/501,331, filed on Jun. 27, 2011.

(51) Int. Cl.
| | | |
|---|---|---|
| H02J 7/00 | (2006.01) | |
| H01Q 9/40 | (2006.01) | |
| H02J 17/00 | (2006.01) | |
| H01Q 21/06 | (2006.01) | |
| G01J 1/42 | (2006.01) | |
| H02J 7/02 | (2006.01) | |

(52) U.S. Cl.
CPC ... *H01Q 9/40* (2013.01); *G01J 1/42* (2013.01); *H02J 7/025* (2013.01); *H02J 17/00* (2013.01); *H01Q 21/061* (2013.01)

(58) Field of Classification Search
USPC .......................................... 320/108; 455/573
See application file for complete search history.

(56) References Cited

U.S. PATENT DOCUMENTS

| | | | | |
|---|---|---|---|---|
| 4,088,999 A | * | 5/1978 | Fletcher et al. | ................ 342/427 |
| 6,421,005 B1 | * | 7/2002 | Weaver et al. | ................ 342/367 |
| 6,967,462 B1 | | 11/2005 | Landis | |
| 7,068,991 B2 | | 6/2006 | Parise | |
| 7,373,133 B2 | * | 5/2008 | Mickle et al. | ............... 455/343.1 |
| 7,606,540 B2 | * | 10/2009 | Yoon | ........................... 455/127.1 |
| 7,747,271 B2 | * | 6/2010 | Walton et al. | ................. 455/522 |
| 7,888,586 B2 | | 2/2011 | Yamamoto et al. | |
| 7,890,145 B2 | * | 2/2011 | Catreux-Erceg et al. | .. 455/562.1 |
| 7,893,564 B2 | | 2/2011 | Bennett | |

(Continued)

OTHER PUBLICATIONS

Zhai, Huiqing et al., "A practical wireless charging system based on ultra-wideband retro-reflective beamforming", Jul. 2010, IEEE, pp. 1-4.*

(Continued)

*Primary Examiner* — Stacy Whitmore
(74) *Attorney, Agent, or Firm* — Kimberly B. Gatling; John P. Zimmer; Smith Moore Leatherwood LLP

(57) ABSTRACT

A system for wireless power transmission may include one or more charging panels and one or more powered devices. The charging panel may include a pilot analysis circuitry, processor and power transmitter. The pilot analysis circuitry may be configured to analyze the magnitude and phase of a pilot signal from the powered device, based on which the processor may be configured to determine a complex conjugate of the pilot signal. And the power transmitter may be configured to cause radiation of a focused wireless power beam to the powered device in accordance with the complex conjugate of the pilot signal and via one or more antenna elements. The charging panel may be one of a plurality of spatially-distributed charging panels each of which includes respective antenna elements that may form an array of antenna elements configured to collaboratively radiate wireless power as a distributed, retro-reflective beamformer.

23 Claims, 12 Drawing Sheets

(56) References Cited

U.S. PATENT DOCUMENTS

| | | | |
|---|---|---|---|
| 7,936,095 B2 | 5/2011 | Kawabata | |
| 8,008,615 B2 | 8/2011 | Hyde et al. | |
| 8,072,380 B2 | 12/2011 | Crouch | |
| 8,097,983 B2 | 1/2012 | Karalis et al. | |
| 8,797,970 B2* | 8/2014 | Xing et al. | 370/329 |
| 2004/0192389 A1* | 9/2004 | Kim et al. | 455/561 |
| 2005/0136841 A1* | 6/2005 | Frank | 455/65 |
| 2005/0197149 A1* | 9/2005 | Iacono et al. | 455/522 |
| 2006/0160517 A1* | 7/2006 | Yoon | 455/299 |
| 2006/0238365 A1 | 10/2006 | Vecchione et al. | |
| 2006/0266917 A1 | 11/2006 | Baldis et al. | |
| 2008/0102881 A1* | 5/2008 | Han et al. | 455/522 |
| 2008/0117961 A1* | 5/2008 | Han et al. | 375/227 |
| 2008/0309452 A1* | 12/2008 | Zeine | 340/5.1 |
| 2009/0102716 A1* | 4/2009 | Sego | 342/377 |
| 2009/0127937 A1 | 5/2009 | Widmer et al. | |
| 2009/0312046 A1* | 12/2009 | Clevenger et al. | 455/522 |
| 2010/0222017 A1* | 9/2010 | Walton et al. | 455/127.1 |
| 2010/0259447 A1* | 10/2010 | Crouch | 342/374 |
| 2010/0315045 A1* | 12/2010 | Zeine | 320/137 |
| 2011/0032866 A1* | 2/2011 | Leabman | 370/316 |
| 2011/0281535 A1* | 11/2011 | Low et al. | 455/129 |
| 2012/0026998 A1* | 2/2012 | O'Keeffe et al. | 370/338 |
| 2012/0045999 A1* | 2/2012 | Ono | 455/67.16 |
| 2013/0039168 A1* | 2/2013 | Forenza et al. | 370/221 |
| 2014/0004912 A1* | 1/2014 | Rajakarunanayake | 455/573 |
| 2014/0029571 A1* | 1/2014 | Lu et al. | 370/331 |
| 2014/0035524 A1* | 2/2014 | Zeine | 320/108 |
| 2014/0086086 A1* | 3/2014 | Zhang et al. | 370/252 |

OTHER PUBLICATIONS

W. C. Brown, The history of power transmission by radio waves, Solar Energy, vol. 56, No. 1, pp. 3-21, Sep. 1996.

R. Bansal, The future of wireless charging, in IEEE Antennas and Propagation Magazine, vol. 5, 2009, p. 153.

Shinohara et al, Recent wireless power transmission technologies in Japan for space soalr power station/satellite, presented at IEEE Radio and Wireless Symposium, San Diego, CA, Jan. 2009.

Kurs et al, Wireless power transfer via strongly coupled magnetic resonances, Science, vol. 317, pp. 83-86, Jul. 2007.

Sample et al, Analysis, experimental results, and range adaptation of magnetically coupled resonators for wireless power transfer, IEEE Transactions on Industrial Electronics, vol. 58, No. 2, pp. 544-554, Feb. 2011.

Li et al, Design of retrodirective antenna arrays for short-range wireless power transmission, IEEE Transactions on Antennas and Propagation, vol. 60, No. 1, pp. 206-211, Jan. 2012.

Rodenbeck et al, A limitation on the small-scale demonstration of retrodirective microwave power transmission from teh solar power satellite, in IEEE Antennas and Propagation, vol. 47, 2005, pp. 67-72.

Little et al, Meeting the challenges of implementing portable space-based solar power, presented at 2011 XXXth URSI General Assembly and Scientific Symposium, Istanbul, Turkey, Aug. 2011.

R. M. Dickinson, Safety Issues in SPS Wireless power transmission, Space Policy, vol. 16, pp. 117-122, 2000.

Hsieh et al, Development of a retrodirective wireless microwave power transmission system, presented at IEEE Antennas and Propagation Society International Symposium, Columbus, Ohio, Jun. 2003.

Shinohara et al, High efficient beam forming with high efficient phased array for microwave power transmission, presented at International Conference on Electromagnetics in Advanced Applications, Torino, Italy, Sep. 2011.

Jaffe et al, Development of a sandwich module prototype for space solar power, presented at IEEE Aerospace Conference, Big Sky, Montana, Mar. 2012.

Stiensiek et al, Wireless power transmission experiment using an airship as relay system and a moveable rover as ground target for later planetary exploration missions, presented at the 8th ESA Workshop on Advanced Space Technologies for Robotics and Automation, Noordwijk, The Netherlands, Nov. 2004.

Henley et al, Wireless power transmission options for space solar power, presented at 34th COSPAR Scientific Aseembly, The Second World Space Congress, Houston, TX, Oct. 2002.

L. M. Jenkins, Concepts for demonstration of wireless power transfer for space-based solar power, presented at IEEE Aerospace Conference, Big Sky, Montana, Mar. 2011.

McSpadden et al, Space solar power programs and microwave wireless power transmission technology, in IEEE Microwave Magazine, vol. 3, pp. 46-57, 2002.

Park et al, Energy harvesting for structural health monitoring sensor networks, Journal of Infrastructure Systems, vol. 14, No. 1, pp. 64-79, Mar. 2009.

Chin et al, An experimental low-cost, low-data-rate rapid structural assessment network, IEEE Sensors Journal, vol. 9, No. 11, pp. 1361-1369, Nov. 2009.

Ikemoto et al, Force sensor system for structural health monitoring using passive RFID tags, Sensor Review, vol. 29, No. 2, pp. 127-136, 2009.

Zhao et al, Wireless ultrasonic transducer network for structural health monitoring of an aircraft wing, presented at 17th World Conference on Nondestructive Testing, Shanghai, China, Oct. 2008.

Jiang et al, Wireless powering of sensors embedded in concrete, presented at IEEE Antennas and Propagation Society International Symposium, Charleston, SC, Jun. 2009.

Shams et al, Wireless power transmission to a buried sensor in concrete, IEEE Sensors Journal, vol. 7, No. 12, pp. 1573-1577, Dec. 2007.

Nothnagel et al, Wireless energy transmission for structural health monitoring embedded sensor nodes, presented at SPIE conference on Health Monitoring of Structural Biological Systems, San Diego, CA, Mar. 2007.

Mascarenas et al, Experimental studies of using wireless energy transmission for powering embedded sensor nodes, Journal of Sound and Vibration, vol. 329, No. 12, pp. 2421-2433, Jun. 2009.

Mascarenas et al, Development of an impedance-based wireless sensor node for structural health monitoring, Smart Materials and Structures, vol. 16, No. 6, pp. 2137-2145, Dec. 2007.

Choi et al, Microwave power for smart material actuators, Smart Materials and Structures, vol. 13, pp. 38-48, 2004.

Carkhuff et al, Corrosion Sensors for Concrete Bridges, IEEE Instrumentation and Measurement Magazine, vol. 6, No. 2, pp. 19-24, Jun. 2003.

Saafi, M., Wireless and embedded carbon nanotube networks for damage detection in concrete structures, Nanotechnology, vol. 20, No. 39, pp. 395502, 2009.

Sha et al., Efficient Measurement of Impulses Based on Frequency-Domain Approach, 2012, IEEE Transaction on Instrumentation and Measurement (8 pages).

Sha et al., Fourier Transforming Microwave Impulses using Low-Cost Analog Circuits, 2011, IEEE. Department of Electrical Engineering, University of Texas at Arlington, Arlington, TX (USA) (4 pages).

* cited by examiner

Phase Difference at Charging Panel A

Phase Difference at Charging Panel B

WIRELESS POWER TRANSMISSION

CROSS-REFERENCE TO RELATED APPLICATION(S)

The present application is related to U.S. Provisional Patent Application No. 61/501,331, entitled: A Wireless Charging System and Method, filed on Jun. 27, 2011, the content of which is incorporated herein by reference in its entirety.

TECHNOLOGICAL FIELD

The present disclosure relates generally to wireless power transmission and, in particular, to a system and method for wireless power transmission that includes planar, smaller and lighter apparatuses, and that transmits power to devices (e.g., portable devices) and with high power transmission efficiency.

BACKGROUND

Numerous portable electronic devices such as laptops, cell phones, digital cameras, electric shavers or the like are not "truly portable" as long as they have to be routinely charged by the line power. A wireless power transmission technique capable of delivering electromagnetic energy to these portable devices without human intervention would make them truly tether free. The relationship between wireless charging and wired charging resembles that between wireless Internet and wired Internet. A "wireless charger" and a wireless router share similar functionality: they both construct wireless links to portable devices. However, they differ in that a wireless router transfers data, whereas a wireless charger broadcasts power.

Wireless charging may be omni-present in the near future as wireless Internet is nowadays, with applications of wireless power transmission seemingly unbounded. As described above, wireless charging may make numerous electronic devices "truly portable" or "truly tether free." Wireless power delivery may be especially valuable in scenarios where wired connections are intractable. For example, if unattended radio frequency identification tags and implanted sensors are powered remotely, they would be free of battery life restrictions and in turn significant functionality enhancements are expected. Furthermore, when applied in conjunction with renewable energy sources (such as wind and solar), wireless power transfer may enable fundamentally new energy scavenging systems with high efficiency and low cost.

Many have investigated power transmission using radio frequency (RF) waves for over a century, the first arguably being Tesla in 1893. However, major advances in this area have been made in the past decade. The most well-known application might be using microwave beam to deliver power from spacecrafts to the earth, although its feasibility is still under evaluation. A case study from 1997 to 2004 constructed a point-to-point wireless electricity transmission to a small isolated village called Grand-Bassin in France. In 2007, a team of researchers from Massachusetts Institute of Technology demonstrated the ability to power a 60-Watt light bulb over two meters using an inductive resonance coupling scheme that makes use of near-field coupling between two magnetic resonators. In 2008, the University of Colorado developed an antenna array to harvest 100 mW of power from an RF transmitter one meter away. In 2009, the Journal of Sound and Vibration published a study of the feasibility of using a car-borne power broadcaster to power sensors installed over a bridge. In addition to the above research endeavors, several companies have developed products targeting for specific applications. For instance, cordless toothbrushes and wirelessly chargeable laptop computers are commercially available. As another interesting application, Alticor's eSpring™ water is processed using wirelessly powered ultraviolet lamps.

Notwithstanding the above and other similar investigations, a large gap still exists between existing technologies and a practical, general-purpose and ubiquitous wireless power transmission system. Specifically, in order to reliably charge portable devices in complex environments of everyday life, several technical challenges must be addressed, including efficiency improvement, safety assurance, and cost, size and weight reduction.

During wireless power transmission, power loss is due to many factors, most notably RF-to-direct-current (RF-DC) conversion and RF propagation. Recent development of rectifying antennas (rectennas) has significantly mitigated RF-DC conversion loss, and spatial beamforming (that is, spatial focusing of electromagnetic radiation) may be an effective means for improving the RF propagation efficiency. Beamforming may be relatively simple for stationary devices with high-gain/highly-directive antennas, but it remains challenging for multiple mobile/portable devices residing in a large area. Traditional phased-array beamforming may not be an ideal solution, as it may fail when the line-of-sight path between the phased-array and the target device is obstructed by obstacles.

As radiation of high-frequency radio waves is potentially harmful to human beings, it may also be challenging to deliver sufficient power to portable devices while ensuring human safety.

Further, some existing solutions may be unsuitable for ubiquitous deployments due to high cost, large size and/or heavy weight. One existing solution, for example, uses three-dimensional coils with radius 25 cm for wireless power reception.

Therefore, it would be desirable to have a system and method that takes into account at least some of the issues discussed above, as well as possibly other issues. More particularly, for example, it would be desirable to have a system for wireless power transmission that includes planar, smaller and lighter apparatuses, and that demonstrates high power efficiency and little hazardous impact.

BRIEF SUMMARY

Example embodiments of the present disclosure are generally directed to a system and method for wireless power transmission, which may have both indoor and outdoor applications. According to one aspect, the system may include one or more charging panels and one or more powered devices configured to selectively operate in a number of modes including a radar mode and power-delivery mode. The charging panel of one aspect may include a pilot analysis circuitry, processor coupled to the pilot analysis circuitry and power transmitter coupled to the processor. The pilot analysis circuitry may be configured to operate in the radar mode to analyze the magnitude and phase of a pilot signal from the powered device. The processor may be configured to operate in the radar mode to determine a complex conjugate of the pilot signal based on the magnitude and phase. And the power transmitter may be configured to operate in the power-delivery mode to cause radiation of a focused wireless power beam to the powered device in accordance with the complex conjugate of the pilot signal. In this regard, the power transmitter may be configured to cause radiation of the focused wireless power beam via one or more antenna elements. The charging panel may be one of a plurality of spatially-distributed charging panels each of which includes respective antenna elements that may form an array of antenna elements configured to collaboratively radiate wireless power as a distributed, retro-reflective beamformer.

In one example, the modes may further include a communication mode, with the charging panel being configured to switch from the radar mode to the power-delivery mode, and periodically switch from the power-delivery mode to the communication mode. In this regard, the charging panel may be configured to operate in the communication mode to receive a charging request signal from the powered device after which the charging panel may be configured to switch back to the radar mode in which the pilot analysis circuitry and processor may be configured to again analyze and determine the complex conjugate of the pilot signal from the powered device. The charging panel may be configured to then switch to the power-delivery mode in which the power transmitter may be configured to cause radiation of a focused wireless power beam to the powered device in accordance with the complex conjugate of the pilot signal.

In one example, the processor or a base station coupled to the processor may be configured to determine an instance in which a line-of-sight path between the one or more antenna elements and powered device is obstructed, and in response thereto, cause deactivation of the power transmitter.

In one example, the pilot signal may include an impulse train having a frequency spectrum covering multiple discrete frequencies. In this example, the pilot analysis circuitry may include multiple parallel branches that are configured to down-convert the pilot signal to a plurality of intermediate-frequency (IF) channels and obtain respective portions of the frequency spectrum of the pilot signal therefrom. In this regard, the portions of the frequency spectrum for every two adjacent channels may partially overlap one another.

In one example, the power transmitter may be configured to cause radiation of the focused wireless power beam assigned to carriers at multiple discrete frequencies. In this example, the power transmitter may include multiple oscillators at respective ones of the multiple discrete frequencies whose signals are phase shifted and amplified according to the complex conjugate of the pilot signal, and summed for radiation via the one or more antenna elements.

In one example, each branch of the pilot analysis circuitry may include an oscillator and mixer configured to down-convert the pilot signal to a respective IF channel, and a number of band-pass filters each of which may capture a respective spectral line of a respective portion of the frequency spectrum of the impulse train. In this example, the frequency spectrum of the impulse train may include spectral lines separated by a frequency $\omega_0$, and the number of band-pass filters may include M band-pass filters for each IF channel, the M band-pass filters being centered at respective ones of $(m-\frac{3}{4}) \times \omega_0$, $m=1, 2, \ldots, M$. Further, for example, the oscillator may have a frequency $\omega_0/4$ less than that of a first spectral line of the respective portion of the frequency spectrum of the impulse train.

According to one aspect, the powered device may include a transmitter and RF to direct current (RF-DC) converter. The transmitter may be configured to operate in the radar mode to cause transmission of the pilot signal to one or more of a plurality of spatially-distributed charging panels each of which includes respective antenna elements. The RF-DC converter may be configured to operate in the power-delivery mode to receive radiated wireless power from the charging panels in accordance with the complex conjugate of the pilot signal. Similar to the charging panel, the powered device may be configured to switch from the radar mode to the power-delivery mode, and periodically switch from the power-delivery mode to the communication mode.

In one example, the powered device may be configured to operate in the communication mode to cause transmission of a charging request signal to the charging panel(s) after which the powered device may be configured to switch back to the radar mode in which the transmitter may be configured to again cause transmission of the pilot signal to the charging panel(s) to determine the complex conjugate of the pilot signal. The powered device may be configured to then switch to the power-delivery mode in which the RF-DC converter may be configured to receive radiated wireless power in accordance with the complex conjugate of the pilot signal.

In one example, the transmitter may comprise an impulse transmitter configured to cause transmission of the pilot signal comprising an impulse train having a frequency spectrum covering multiple discrete frequencies. And in another example, the RF-DC converter may be configured to receive radiated wireless power assigned to carriers at multiple discrete frequencies.

BRIEF DESCRIPTION OF THE DRAWING(S)

Having thus described example embodiments of the disclosure in general terms, reference will now be made to the accompanying drawings, which are not necessarily drawn to scale, and wherein:

DETAILED DESCRIPTION

Figure 1A:
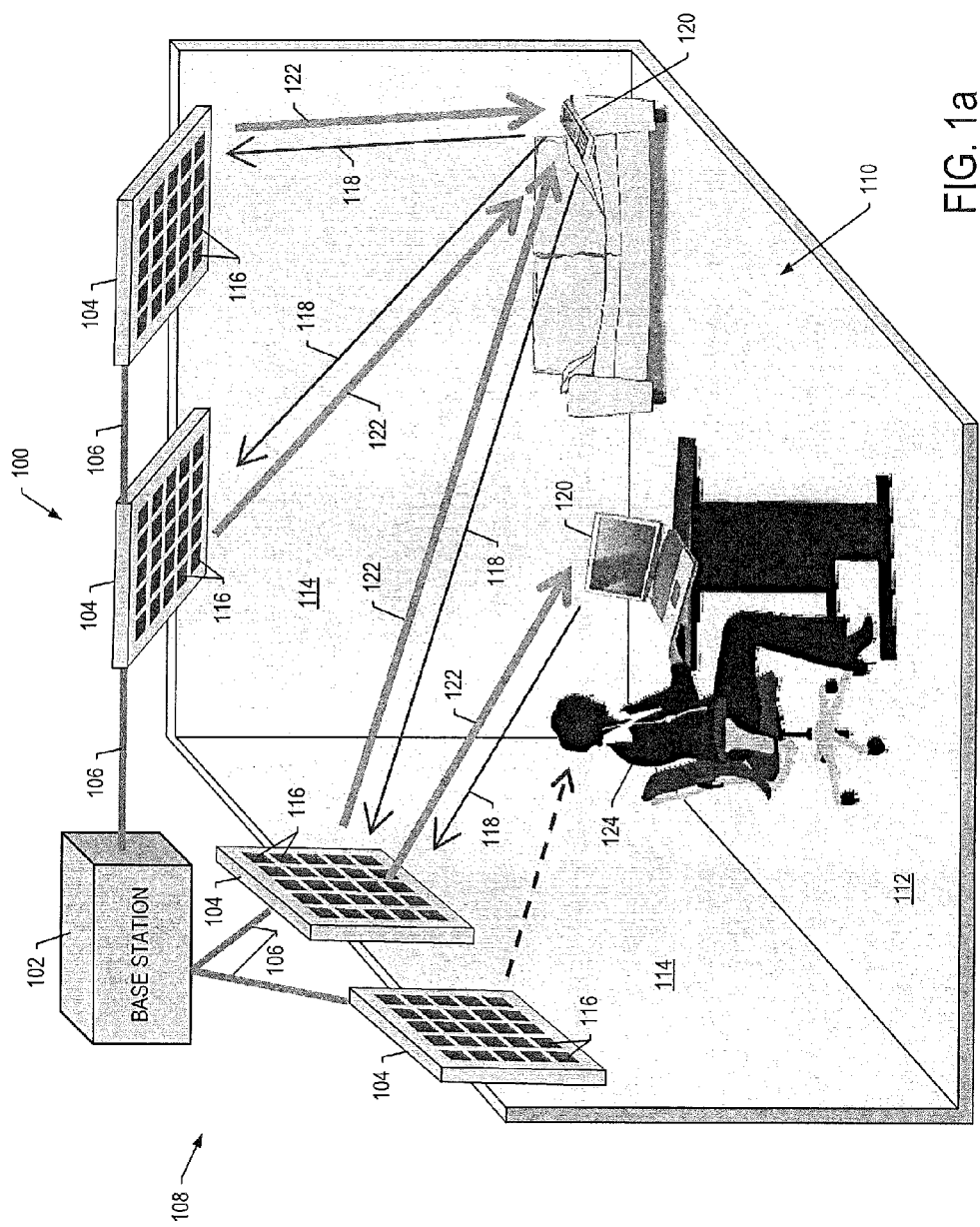
FIGS. 1a, 1b and 1c (collectively "FIG. 1") illustrate a system according to example embodiments.

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

Figure 1B:
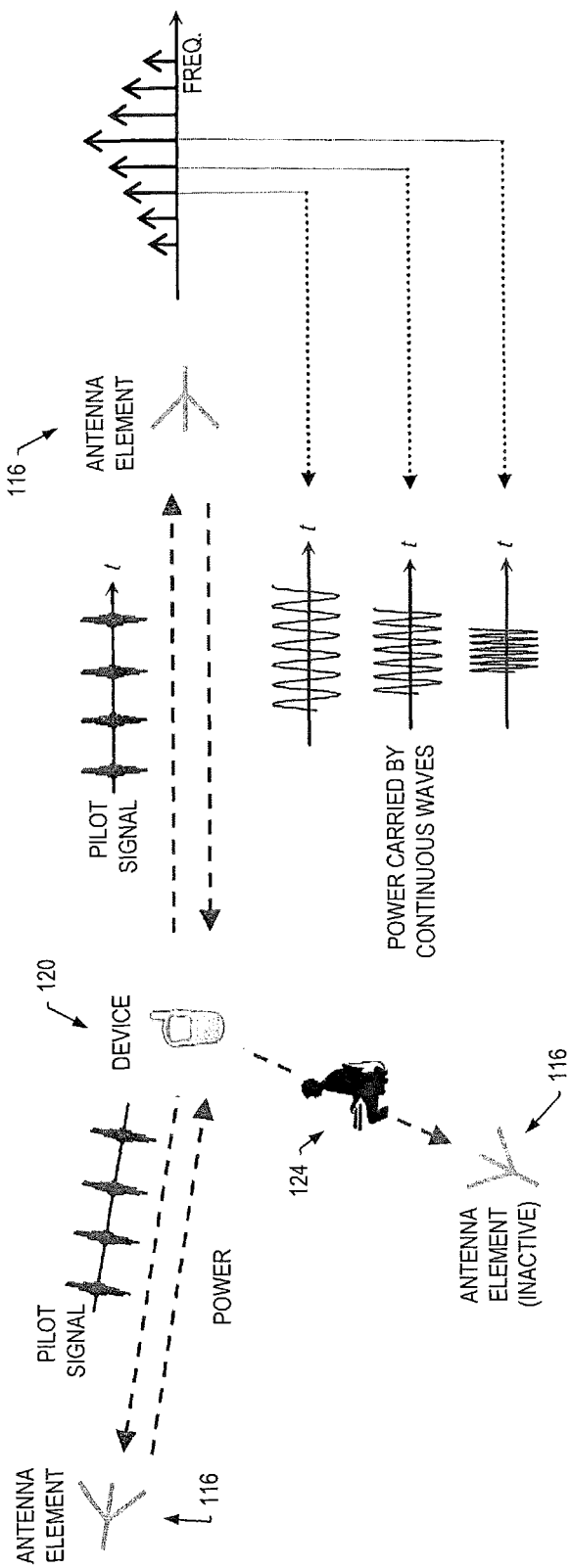
Figure 1C:
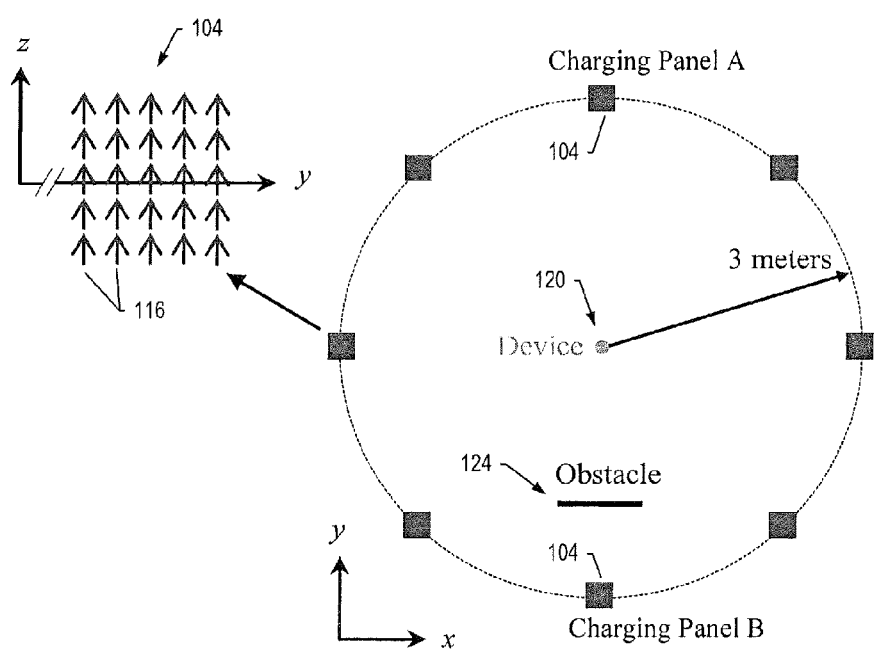

FIGS. 1a, 1b and 1c illustrate a system 100 for wireless power transmission in accordance with one example embodiment. As shown, the system includes a base station 102 coupled to a plurality of charging panels 104, such as by appropriate wiring 106. In other instances, the base station and charging panels may be referred to as a central station and base stations, respectively. As described herein, the base station and charging panels may form a subsystem, which without loss of generality may be termed a "charger" or "wireless charger" 108 herein.

The wireless charger 108 may have a fixed spatial location once installed for operation. The charging panels 104 (and possibly also the base station 102) may be installed in a spatial region 110, and in one example, may be positioned above the ground 112 such as secured to or otherwise disposed on the ceiling or one or more walls 114 within the region. The charging panels may be distributed (rather than localized) in space, and each charging panel may include one or more antenna elements 116 and associated circuitry. As shown in FIG. 1a, for example, each charging panel may include an array of equidistant antenna elements and associated circuitry. As shown and described herein, reference to a charging panel may equally apply to its antenna elements, and reference to an antenna element may equally apply to the charging panel of which the antenna element is a part.

Generally, the charging panels 104 may be configured to receive pilot signals 118 from one or more portable or fixed powered, target devices 120 residing in the region 110, and which powered devices may each include one or more antenna elements. Under coordination of the base station 102, the charging panels may be configured to respond to the pilot signals by collaboratively radiating wireless power to the devices as a beamformer. In other words, the charging panels may jointly establish focused electromagnetic beams 122 onto the target devices. The charging panels may therefore wirelessly deliver power to the devices, such as for operation of the devices or charging respective batteries of the devices. This type of beamforming may result in dedicated power delivery channels to the devices while minimizing power levels in other locations in the region, which may in turn ensure high efficiency and human safety at the same time.

As suggested above and explained in greater detail below, the system 100 of example embodiments may provide at least some improvements over prior wireless power transmission techniques, including for example, near-field coupling, point-to-point charging and phased-array beamforming.

Near-field coupling techniques (including inductive coupling) may employ a coil as the charger to disperse electromagnetic fields in all directions. If the target devices' locations are unknown, the coil must generate strong fields to cover the entire region, which may in turn cause over-illumination to nearby humans and objects. The beam focusing capability of the system of example embodiments of the present disclosure on the other hand is based on propagating electromagnetic waves (that is, far-field). In accordance with example embodiments, on the other hand, focusing of electromagnetic far-field may effectively form a dedicated wireless channel between the wireless charger 108 and a target device 120. The system of example embodiments may therefore achieve high power transmission efficiency and simultaneously ensure human safety.

The point-to-point charging technique may employ a highly-directive antenna as the charger to power a target device with a known location, which may not be practical for charging mobile/portable devices whose locations may change over time. The system 100 of example embodiments, on the other hand, may be configured to reconfigure its beam 122 to track mobile/portable devices 120 with the aid of pilot signals 118 from the devices.

Phased-array beamforming may also dynamically steer a beam. But since a practically low-cost phased-array does not have large size (typically a few wavelengths), the wireless link between the target device and phased-array charger may fail if their line-of-sight path is obstructed by any obstacle. In the system 100 of example embodiments, the charging panels 104 may be spatially distributed over the region within which they are installed. Consequently, the obstructed charging panels may be deactivated while power transmission is fulfilled by the remaining active charging panels, which may in turn permit effective power transmission to devices 120 in most locations within the region.

Now turning to FIG. 1b, as a distributed beamformer, the wireless charger 108 may perform beamforming according to any of a number of different techniques. In one example, the wireless charger may perform retro-reflective beamforming, which may enable the system to achieve efficient, safe, and reliable wireless power transmission to powered devices 120. Although retro-reflective beamforming has been investigated by antenna engineers for many years, existing retro-reflective techniques have been unable to satisfy a number of practical requirements for wireless power transmission.

In a typical retro-reflective array of antenna elements, the antenna elements receive a continuous-wave pilot signal from a target device. Each antenna element analyzes the phase of the pilot signal, and retransmits a complex conjugate version of the pilot signal back to the target device. This results in a beam that is spatially focused onto the origin of the pilot signal, namely the target device. Underlying theory of the retro-reflective technique is the same as that of time-reversal. That is, it takes advantage of channel reciprocity and acts as a space-time matched filter. As a result of channel reciprocity, the waves "retro-reflected by the retro-reflective array" are constructive at the target device and destructive elsewhere. Furthermore, beam focusing due to retro-reflection/time-reversal does not suffer from multi-path environments. Nevertheless, the conventional retro-reflective array suffers a number of deficiencies for application in wireless power transmission; for instance, substantial overhead power consumption may be required by the continuous-wave pilot signal.

FIG. 1b illustrates a retro-reflective scheme that may be employed by the system 100 of example embodiments, which may improve typical retro-reflective techniques in a number of aspects. A target device 120 may be configured to transmit a pilot signal 118 comprising a train of periodic impulses, which may be received by the retro-reflective array. Each antenna element 116 of the retro-reflective array may be configured to analyze the spectrum of the pilot signal, which may include multiple discrete spectral lines. Then in accordance with the outcome of analyzing the pilot signal, each antenna element may transmit wireless power to the target device. In one example, the wireless power may be carried by multiple discrete frequencies, and at each discrete frequency, the phase and magnitude of the power transmission may be determined by the complex conjugate of the pilot signal at the respective frequency.

Compared to a typical retro-reflective technique, the retro-reflective scheme of example embodiments may differ in a number of respects, and may be more suitable for wireless power transmission.

In the retro-reflective scheme of example embodiments, the antenna elements 116 may be spatially distributed in the region 110 in which the target devices 120 reside. Even further, the antenna elements may be distributed without imposition of a strict restriction on their spatial locations, which may offer construction flexibility as well as reliability and safety. For example, the antenna elements may be spatially distributed and configured such that only the elements with line-of-sight paths to the target device are active to transmit wireless power. As a result, if an obstacle 124 such as a human being resides between the target device and any array element, he/she may not be under direct electromagnetic illumination. And if the antenna elements are appropriately distributed in the region, a sufficient number of antenna elements may have line-of-sight paths to the target device to fulfill the wireless transmission. Detection of obstacles 124 may be accomplished in any of a number of different manners, such as using time-of-arrival together with matrix-pencil processing of the pilot signal 118. The distributed antenna elements may also be synchronized in time, as explained in greater detail below.

FIG. 1c illustrates a numerical example for obstacle detection according to one example embodiment. As shown, a number of charging panels 104 (e.g., eight) may be assumed to be deployed over a circle with radius three meters in the x-y plane. Each charging panel may include an array of equidistant antenna elements 116 (e.g., 5×5 array of elements spaced apart by 12 cm). One target device 120 resides at the center of the circle. In this example, the antenna elements of the charging panels and target device may be z-oriented dipoles. The device may be configured to transmit an impulse train as the pilot signal, which may cover frequency band 4-6 GHz. An obstacle 124 (e.g., 1.0 meter long by 0.6 meter high metallic plate) may be placed to obstruct the line-of-sight path between the device and one of the charging panels, namely a charging panel B.

Figure 2A:
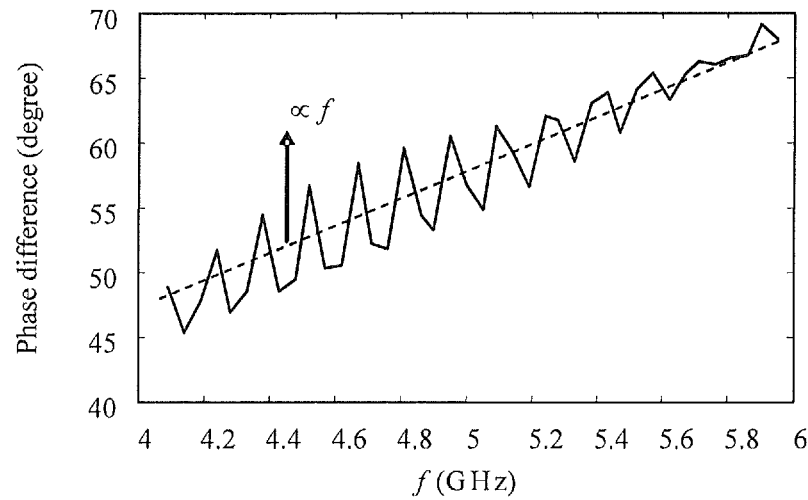
FIGS. 2a and 2b (collectively "FIG. 2") are graphs of the phase differences of pilot signals received by a wireless charger according to example embodiments.
Figure 2B:
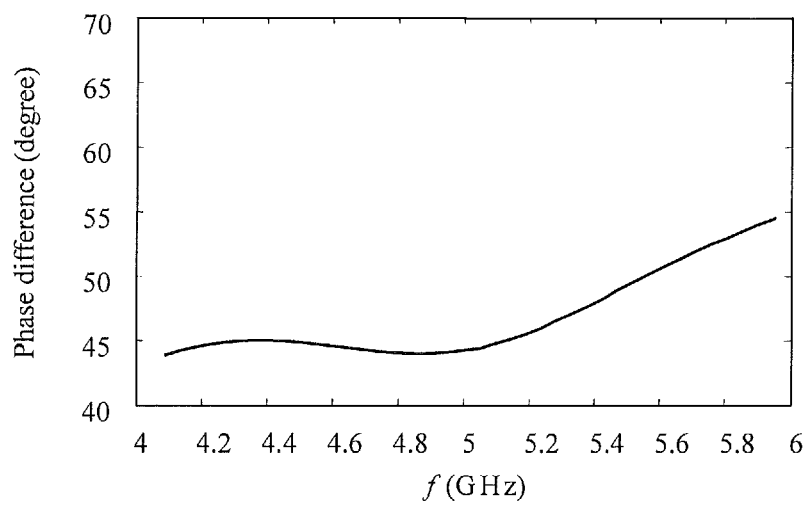

Continuing the above example, two of the charging panels 104, namely charging panels A and B, may be selected to process the pilot signal. At both charging panels A and B, phase differences between two local antenna elements 116 are plotted in FIGS. 2a and 2b, respectively. One of the two local elements may be at the center and the other at the corner in the respective antenna arrays. Since charging panel A has line-of-sight interaction with the device 120, its phase difference may follow a straight line proportional to the frequency (frequency is denoted as "f" in FIG. 2). However, such a pattern does not appear at charging panel B because of the obstacle 124. A simple pattern recognition algorithm may therefore be implemented by the base station 102 or charging panels themselves to determine that charging panel A should be active while charging panel B should be deactivated for power transmission.

In contrast to typical retro-reflective techniques that involve a continuous-wave signal at a single frequency, the retro-reflective array of antenna elements 116 of example embodiments may incorporate multiple frequencies. The typical single frequency operation may not be optimal for wireless power transmission for a number of reasons. First, if operating at a single frequency, the distributed beamforming of example embodiments may result in undesired spatial focal points other than to the target device 120 (the undesired focal points may be equivalent to side lobes in phased-array beamforming). Second, propagation of strong power at a single frequency may cause interferences to other electrical equipment in the region. Third, single frequency operation may require bulky and expensive vacuum tubes (e.g., traveling-wave tubes) to generate the required power.

To avoid the above and other disadvantages of single frequency operation, in the retro-reflective array of antenna elements 116 of example embodiments, a total required power may be assigned to carriers at multiple discrete frequencies, which may be programmable to best fit the application environment. In one example, the operating frequencies may be chosen to reside in the ISM (industrial, scientific and medical) band around 5.8 GHz. Due to small wavelengths in this band, the antenna elements may be compact in size (e.g., a few centimeters); also, low-cost and low-power integrated circuitry may be realized such as by mature CMOS (complementary metal-oxide-semiconductor) technology.

Even further, for example, the target device 120 may be configured to transmit the pilot signal 118 as a train of periodic impulses, in contrast to the continuous-wave pilot signal of the typical retro-reflective technique. In one example, the frequency spectrum of the impulses may cover the discrete frequencies of power transmission to the target device. As a result, information of the multiple frequency carriers may be "packed" into impulses and transmitted at one shot. Generation and reception of such an impulse train may be realized using low-complexity and low-power circuitry, and may be exploited to achieve communication between the wireless charger 108 and target devices.

The system 100 of example embodiments employing the aforementioned retro-reflective beamforming scheme may satisfy the specifications for practical wireless power transmission. More particularly, for example, the system may be deployable in everyday complex environments, such as convention rooms, warehouses, construction fields, parking lots or the like. The system may be operable in various weather conditions (e.g., rain, snow, fog). The system may be configured to track and wirelessly deliver power to multiple devices 120 at the same time. The system may also have high RF propagation efficiency and be safe to human beings. Also, the system may be composed of planar antenna elements and solid-state circuitry, and may therefore be low cost, compact in size and/or low weight.

Figure 3:
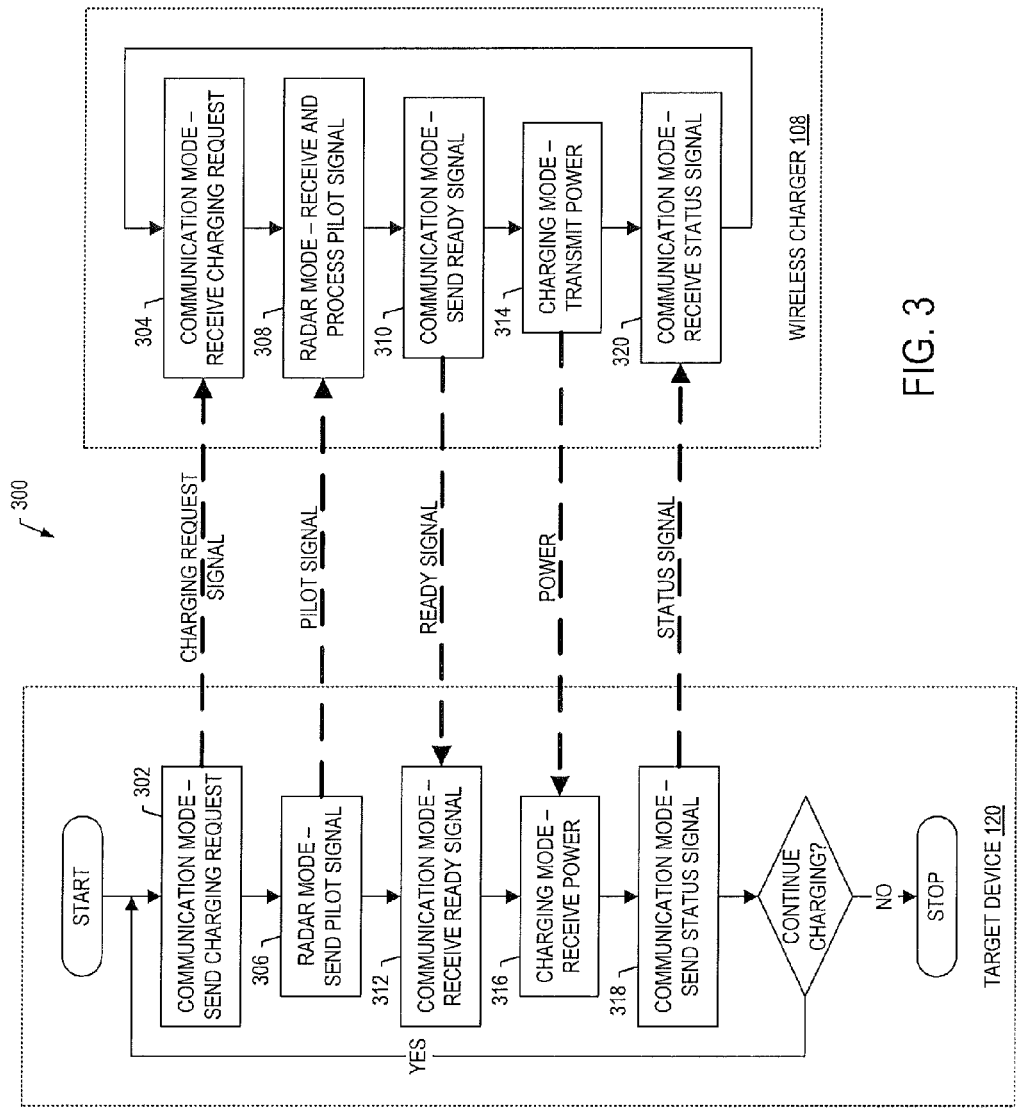
FIG. 3 is a flowchart illustrating various operations in a method of wireless power transmission according to example embodiments.

Reference is now made to FIG. 3. In contrast to conventional wireless power transmission systems, the system 100 of example embodiments may integrate three technological elements, namely charging or power delivery, communication and radar tracking. More particularly, for example, the system of example embodiments may utilize radar tracking to localize target devices 120 and deliver focused electromagnetic beams of power 122, and coordination between radar tracking and power delivery may be made possible by the communication. In this regard, the system and more particularly its components may selectively operate in three modes, namely, power-delivery (also termed "charging"), communication and radar.

FIG. 3 illustrates a flowchart of a method 300 of wireless power transmission according to one example embodiment of the present disclosure. As shown, the method may include a target device 120 detecting a battery deficiency or otherwise an additional power requirement. As shown in block 302, with the system 100 in the communication mode, the target device may transmit a "charging request" signal to the wireless charger 108, which again may include the base station 102 and charging panels 104. As shown in block 304, the wireless charger may receive and acknowledge the charging request signal. The system may then enter the radar mode. In the radar mode, as shown in block 306, the target device may transmit a pilot signal 118, which, as shown in block 308, the wireless charger may receive and process in preparation for retro-reflective beamforming by the charging panels. The wireless charger may also receive and process the pilot signal to determine whether or not line-of-sight paths between the charging panels and target device are obstructed, such as to activate any unobstructed charging panels and/or deactivate any obstructed charging panels in the charging mode.

The wireless charger 108 and target device 120 may again enter the communication mode in which the wireless charger may transmit a "ready" signal to the target device to inform the device that the wireless charger is ready to wirelessly transmit power to the target device, as shown at blocks 310, 312. The wireless charger and target device may then enter the charging mode in which the active charging panels 104 (with "active charging panels" denoting the charging panels with line-of-sight paths to the target device) of the wireless charger may wirelessly transmit power to the target device through spatially focused beams 122, which the target device may receive to charge its battery or otherwise power the target device, as shown at blocks 314, 316. Obstructed charging panels (with "obstructed charging panels" denoting the charging panels without line-of-sight paths to the target device) may be prevented from wirelessly transmitting power until such time as the respective charging panels are no longer obstructed from the target device.

During the charging process, the target device 120 may move and another target device may request wireless power transmission, which may necessitate a dynamic beamforming plan. The system 100 of example embodiments may therefore be periodically switched to the communication mode in which the target device may transmit a "status" signal to the wireless charger 108 to indicate whether or not the target device desires to continue receiving power from the wireless charger, as shown in blocks 318, 320. In one example, the target device may desire to continue charging until its battery is full or until the device no longer requires additional power. In instances in which the device desires to continue charging, the method may restart with the target device transmitting a charging request signal to the charger (see block 302).

The switching periodicity for the target device 120 to send the "status" signal and restart the method may depend on many factors. A large periodicity may be beneficial in order to maintain high efficiency, but it may create too much latency for the system 100 to track the devices and/or to avoid illuminating people. In one example, the periodicity may be determined through power management/optimization with instantaneous safety power level for humans as a constraint.

Figure 4:
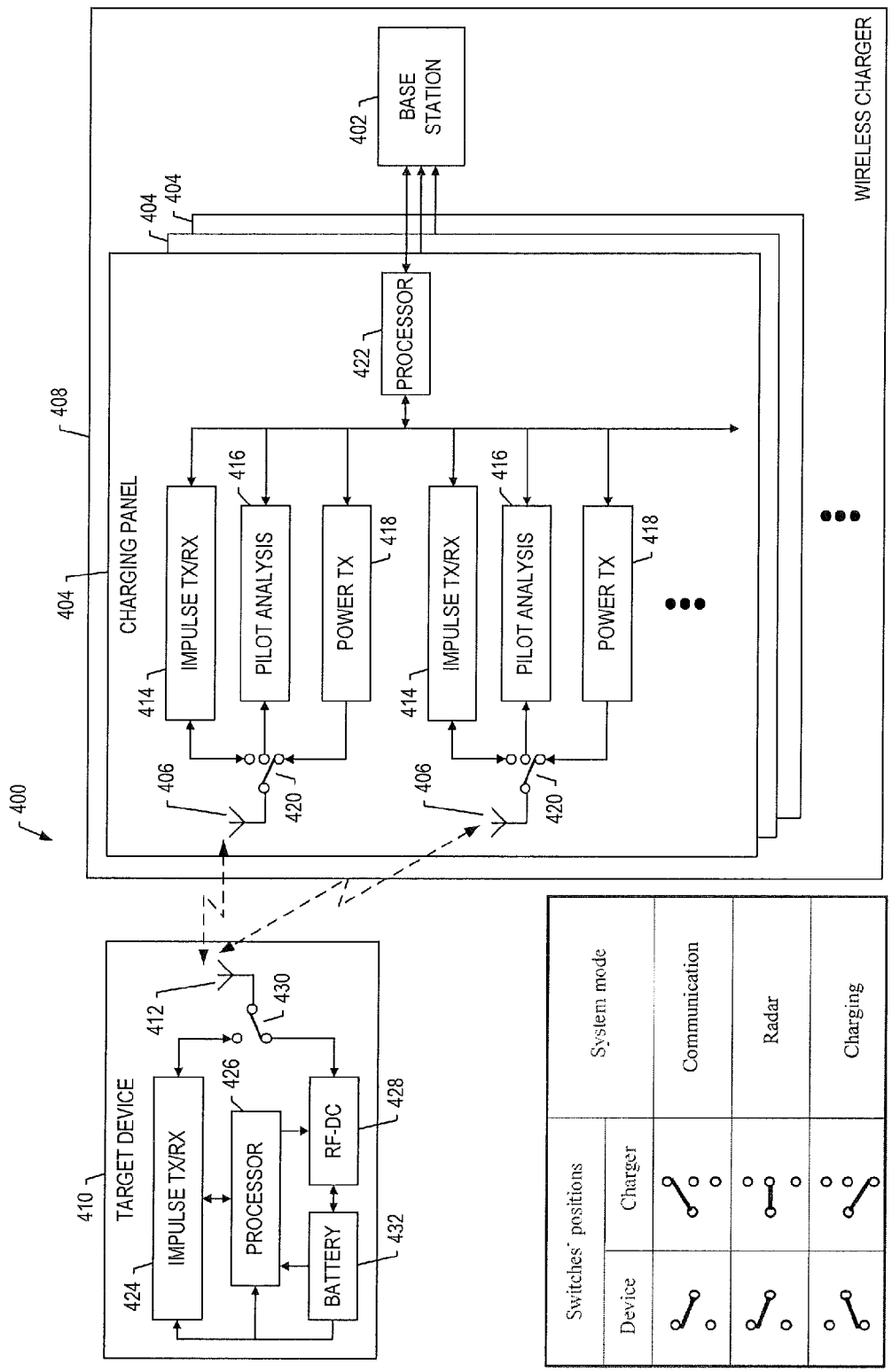
FIG. 4 is a block diagram of a system that in one example embodiment may correspond to the system of FIG. 1.

FIG. 4 illustrates a block diagram of a system 400 that in one example embodiment may correspond to the system 100 of FIG. 1. As shown, the system includes a base station 402 coupled to a plurality of charging panels 404 each of which may include an array of antenna elements 406 and associated circuitry, and in which base station and charging panels may limn a wireless charger 408. The system may also include one or more target devices 410 each of which may include an antenna element 412 and associated circuitry. In one example, the wireless charger and its base station, and charging panels and their antenna elements and associated circuitry of FIG. 4 may correspond to respective ones of the wireless charger 108 and its base station 102, and charging panels 104 and their antenna elements 116 and associated circuitry of FIG. 1. Similarly, in one example, the device of FIG. 4 may correspond to the target device 120 of FIG. 1.

As shown, the circuitry associated with each antenna element 406 may include an impulse transmitter/receiver (Tx/Rx) 414, pilot analysis circuitry 416 and a power transmitter 418. A switch 420 may be configured to selectively couple the impulse Tx/Rx, pilot analysis circuitry or power transmitter to the respective antenna element. And as also shown, the circuitry associated with the antenna elements may be coupled to a processor 422 of the charging panel, which may further be coupled to the base station 402.

Similar to the charging panel 404, the circuitry of the target device 410 may include an impulse Tx/Rx 424. The circuitry of the target device may also include a processor 426, RF-DC converter 428, and a switch 430 configured to selectively couple the impulse Tx/Rx or RF-DC converter to the antenna element 412. As also shown, the target device may include a battery 432 configured to power the target device.

The positions of the switches 420, 430 of the charging panel 404 and target device 410 may dictate the system's mode, as tabulated in FIG. 4.

Generally, for the charging panel 404, the pilot analysis circuitry 416 may be configured to operate in the radar mode to analyze the magnitude and phase of a pilot signal from the powered device 410. The processor 422 may be coupled to the pilot analysis circuitry and configured to operate in the radar mode to determine a complex conjugate of the pilot signal based on the magnitude and phase. And the power transmitter 418 may be coupled to the processor and configured to operate in the charging mode to cause radiation of one or more focused wireless power beams to the powered device in accordance with the complex conjugate of the pilot signal. In this regard, the power transmitter may be configured to cause radiation of the focused wireless power beam via antenna elements 406 in the charging mode. As shown, the charging panel may be one of a plurality of spatially-distributed charging panels each of which includes respective antenna elements that may form an array of antenna elements configured to collaboratively radiate wireless power as a distributed, retro-reflective beamformer.

The modes may further include a communication mode, with the charging panel 404 being configured to switch from the radar mode to the charging mode, and periodically switch from the charging mode to the communication mode. In this regard, the charging panel may be configured to operate in the communication mode to receive a charging request signal from the powered device 410 after which the charging panel may be configured to switch back to the radar mode in which the pilot analysis circuitry 416 and processor 422 may be configured to again analyze and determine the complex conjugate of the pilot signal from the powered device. The charging panel may be configured to then switch to the charging mode in which the power transmitter 418 may be configured to cause radiation of one or more focused wireless power beams to the powered device in accordance with the complex conjugate of the pilot signal.

Conversely, the impulse transmitter (of the impulse Tx/Rx 424) of the powered device 410 may be configured to operate in the radar mode to cause transmission of the pilot signal to one or more of a plurality of spatially-distributed charging panels 404 each of which includes respective antenna elements 406. The RF-DC converter 428 may be configured to operate in the charging mode to receive radiated wireless power from the charging panels in accordance with the complex conjugate of the pilot signal.

Similar to the charging panel 404, the powered device 410 may be configured to switch from the radar mode to the charging mode, and periodically switch from the charging mode to the communication mode. The powered device may be configured to operate in the communication mode to cause transmission of a charging request signal to the charging panel(s) after which the powered device may be configured to switch back to the radar mode in which the impulse transmitter (of the impulse Tx/Rx 424) may be configured to again cause transmission of the pilot signal to the charging panel(s) to determine the complex conjugate of the pilot signal. The powered device may be configured to then switch to the charging mode in which the RF-DC converter 428 may be configured to receive radiated wireless power in accordance with the complex conjugate of the pilot signal.

In the communication mode, the impulse Tx/Rx 414, 424 of the charging panel 404 and target device 410 may form a communication pair. In the radar mode, the impulse train transmitted by the device may behave as pilot signals, and may be received and analyzed by the pilot analysis circuitry 416 of the charging panel. In the charging mode, the power transmitter 418 of the charging panel may generate RF power according to the analysis output of the pilot analysis circuitry in order to achieve retro-reflective beamforming. The RF power received by the device may be converted to DC power by its RF-DC converter 428, and delivered to the battery 432 or other electronics requiring power.

The processors 422, 426 of the charging panel and device, as well as the base station 402, may be configured to execute processing/control jobs. As indicated above, these processing/control jobs may include communication, radar tracking and controlling power delivery. Additionally, the processing/control jobs may include the processor of the charging panel or base station being configured to determine an instance in which a line-of-sight path between the one or more antenna elements 406 and the device 410 is obstructed, and in response thereto, cause deactivation of respective power transmitter(s) 418.

Each of the components of each of the wireless charger 408 and target device 410, including those shown in FIG. 4, may be implemented in any of a number of different manners. For example, the impulse Tx/Rx 414, 424 may be implemented in any manner similar to those described in any of the following: J. Li et al., *A CMOS Ultra-Wideband Impulse Generator for 22-29 GHz Automotive Radar Applications*, presented at IEEE Radar Conference, Pasadena, Calif. (May 2009); or V. Shenoy et al., *A Dual Slope Based Pulse Position Modulation for sub-GHz IR-UWB Systems*, presented at IEEE Midwest Symposium on Circuits and Systems, Knoxville, Tenn. (August 2008). The content of each of the following is incorporated by reference in its entirety.

The antenna elements 406, 412 of the charging panel 404 and target device 410 may comprise any of a number of different types of antennas.

Figure 5:
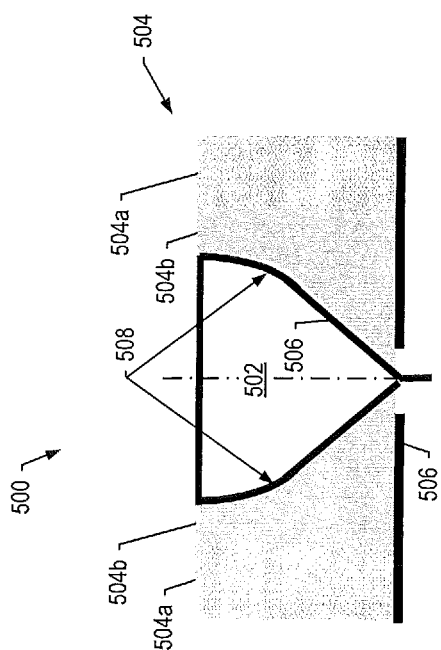

In a more particular example, the antenna element 412 of the target device 410 may be designed to satisfy any of a number of different specifications such as, for example, one or more of the following: (i) wideband (e.g., 4-6 GHz), (ii) omni-directional, and (iii) small size, light, conformal and/or easy to integrate. FIG. 5 illustrates an antenna element 500, which in one example embodiment may correspond to antenna element 412. As shown in FIG. 5, the antenna element may have a quasi-planar conical configuration including a cavity 502 etched into a dielectric slab 504. A thin layer of conductor 506 may be coated onto the cavity wall and bottom of the dielectric slab, with the coating on the bottom of the dielectric slab serving as a ground plane for the antenna element. As shown, the cavity may generally have a conical shape but may be slightly reshaped 508 from a pure conical shape, and the dielectric slab may include multiple materials (two shown as 504a, 504b) to optimize the antenna's performance. The antenna element of this example embodiment may therefore exhibit large bandwidth, omni-directional radiation pattern and desirable mechanical properties (e.g., robust, light, conformal, easy to fabricate and integrate, etc.).

Like the antenna element 412 of the target device 410, the antenna elements 406 of the charging panel 404 may also be designed to satisfy any of a number of different specifications. For example, the antenna elements of the charging panel may be designed to have a low profile so that they may be easily secured to the ceiling or wall (e.g., wall 114), and/or to cover a certain frequency range (e.g., 4-6 GHz). In one example, the antenna elements of the charging panel may be cavity-backed slot radiators. These radiators may be planar and conformal, and their bandwidth may be enlarged by simply revising the slots' shapes. Mutual couplings among the antenna elements may be minimal because of their cavities' isolation, and their radiation performances may be insensitive to a truncated ground plane.

Figure 6:
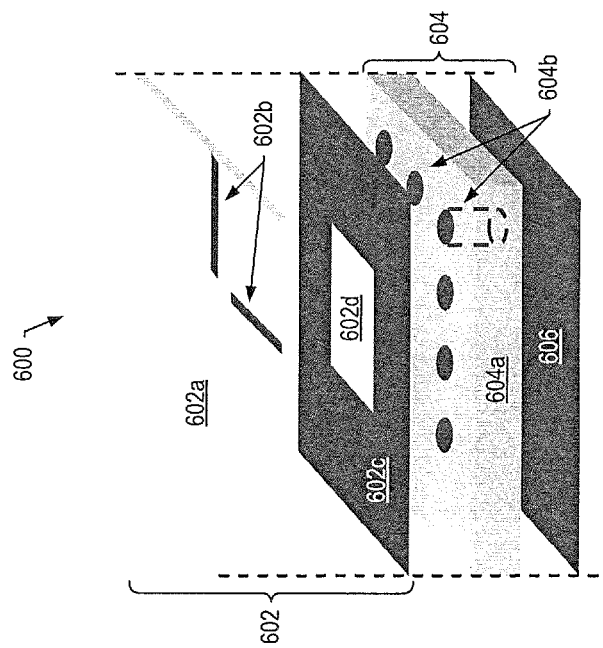
FIGS. 5 and 6 are antenna elements according to example embodiments.

FIG. 6 is an exploded view of an antenna element 600, which in one example embodiment may correspond to antenna element 406. As shown in FIG. 6, the antenna element may include three layers. The top layer may include a double-clad printed circuit board 602; the middle layer 604 may include a dielectric-supported cavity; and the bottom layer may include a conductor plate serving as a ground plane 606. The printed circuit board may include a substrate 602a on both sides of which a conductor may be disposed. On the top side of the substrate, a top conductor may form microstrip lines 602b that may serve as feed lines; and on the bottom side of the substrate, a bottom conductor 602c may be etched to define a radiating slot 602d. The middle layer may include a dielectric slab 604a that may be perforated to form a plurality of vias 604b therein, the dielectric slab thereby mechanically supporting the vias. The vias may electrically connect the bottom conductor 602c and ground plane 606, and may serve as a wire-grid cavity. This example antenna element may be fabricated solely using printed circuit process, and may therefore be low-cost, conformal and/or easy to integrate. And circuitry coupled to the antenna element may reside beneath the ground plane, and may be well isolated from the antenna.

Figure 7:
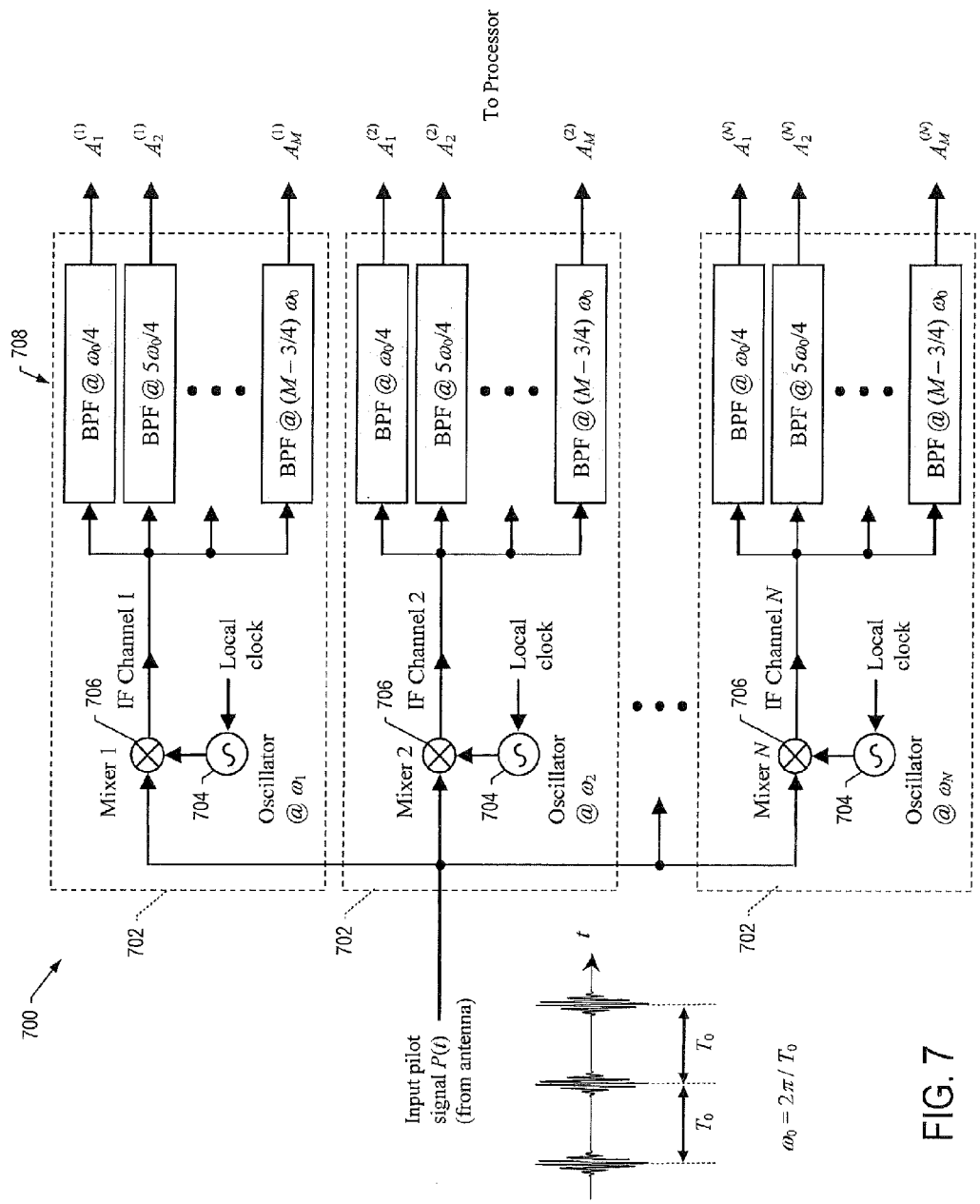
FIG. 7 illustrates pilot analysis circuitry according to one example embodiment.

FIG. 7 illustrates pilot analysis circuitry 700, which in one example may correspond to pilot analysis circuitry 416. As indicated above, the pilot signal impulse train transmitted by a target device (e.g., device 410) may be received and analyzed by the pilot analysis circuitry. In this regard, the pilot analysis circuitry may be configured to analyze the pilot signal to obtain its amplitude and phase. In various examples, the pilot analysis circuitry may be configured to carry out a Fourier transformation, and in such examples may be more particularly referred to as Fourier analysis circuitry. Since the pilot signal may be composed of impulses, it may be practically unaffordable to sample the pilot signal in time and calculate Fourier transform using digital circuits.

The pilot analysis circuitry 700 of one example embodiment may include multiple parallel channels to down-convert the input pilot signal. Each channel may be configured to obtain a portion of the input's frequency spectrum with the aid of band-pass-filters; in other words, each channel may serve as a narrow-band receiver. Overlapping bands may be designated in between every two adjacent channels such that multiple narrow-band outcomes may be accurately merged to construct the entire frequency spectrum. The pilot analysis circuitry of example embodiments may resemble a superheterodyne receiver; and hence, it may be simple, robust and/or low-cost. In this regard, the pilot analysis circuitry may be composed of commercially available semiconductor components, including oscillators, multipliers/mixers, filters, amplifiers and the like; and it may therefore embody a compact and low-cost system-on-a-chip implementation.

The pilot analysis circuitry 700 may be configured to receive an input pilot signal P(t) composed of an impulse train with temporal periodicity $T_0$. In one example, the frequency spectrum of P(t) includes spectral lines separated by $\omega_0 = 2\pi/T_0$. The pilot analysis circuitry may be generally configured to obtain the complex-valued spectral samples of P(t). These spectral samples may be fed to a processor (e.g., processor 422), which may conduct a complex conjugate operation on the spectral samples, and may control the power transmitter 418 based thereon.

Figure 8:
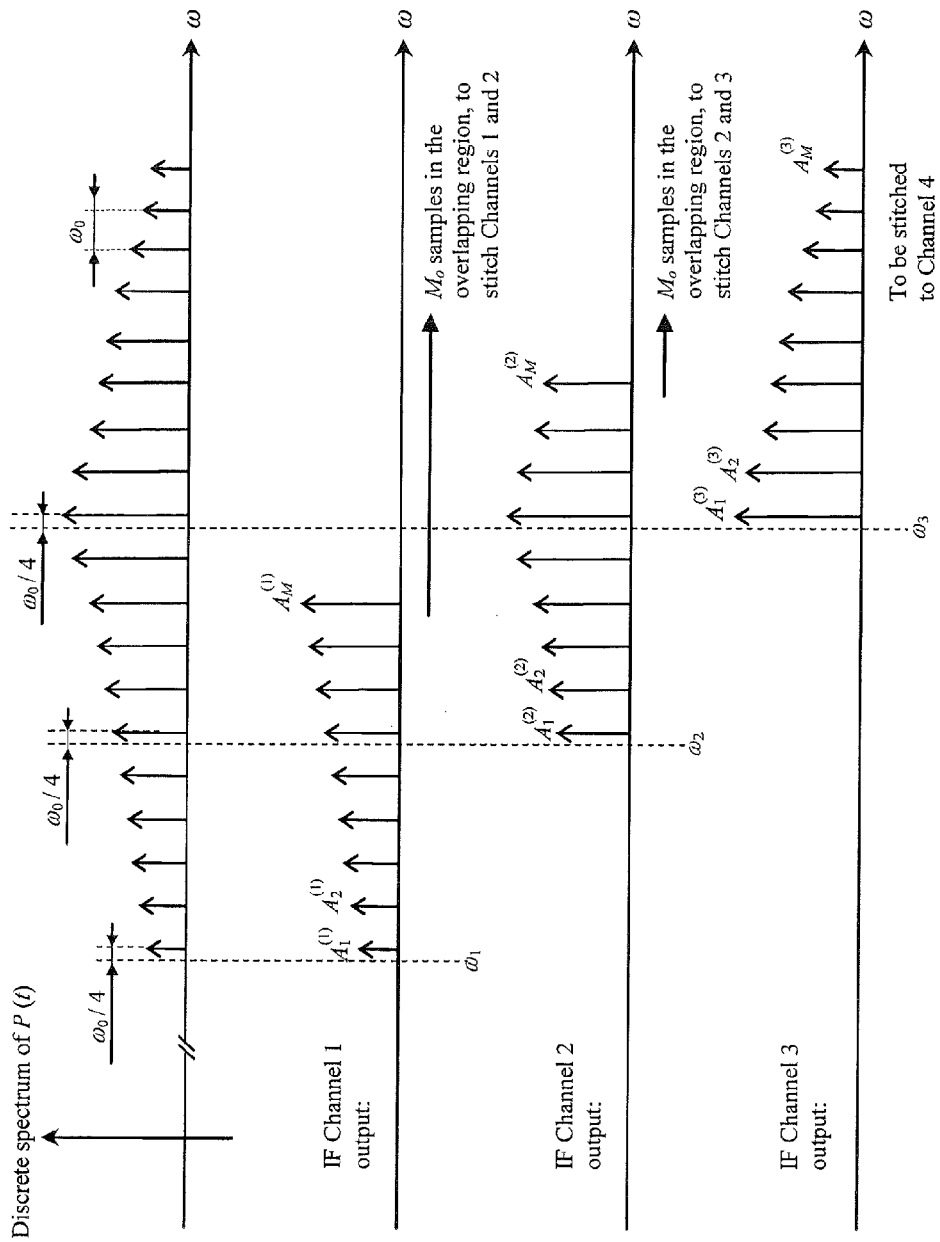
FIG. 8 illustrates spectral lines that may be captured by the pilot analysis circuitry of FIG. 7 for a number of intermediate-frequency (IF) channels, according to one example embodiment.

As shown in FIG. 7, in one example, the pilot analysis circuitry 700 may include N parallel branches 702 to process the input pilot signal P(t), with each branch behaving as a down-converter. In this regard, the N branches may include N local oscillators 704 and N mixers 706 to down-convert P(t) to N intermediate-frequency (IF) channels. Each of the IF channels may be followed by M band-pass-filters (BPFs) 708, which may be centered at respective frequencies $(m-\frac{3}{4}) \times \omega_0$, m=1, 2, ..., M. In an instance in which each oscillator's frequency is $\omega_0/4$ distance to the left of (i.e., less than) a certain spectral line of P(t) and the BPFs' bandwidth is narrow enough, each BPF may capture a spectral line as illustrated in FIG. 8. The N oscillators may be locked/synchronized by one stable clock signal. As a result, outputs of the N×MB PFs may be measured with respect to the clock to obtain complex values (including magnitude and phase) of P(t)'s frequency spectrum, which may be denoted by complex numbers $A_m^{(n)}$, m=1, 2, ..., M, n=1, 2, ..., N.

In one example, there may be an overlapping region that includes $M_O$ spectral lines between every two adjacent IF channels. In FIG. 8, these overlapping regions are marked by the shaded areas. In one example, the following two groups of data may originate from the same spectral samples of P(t):

$$\begin{matrix} \{A_{M-M_O+1}^{(n)}, A_{M-M_O+2}^{(n)}, \ldots, A_M^{(n)}\} \\ \{A_1^{(n+1)}, A_2^{(n+1)}, \ldots, A_{M_O}^{(n+1)}\} \end{matrix}, n = 1, 2, \ldots, N-1 \quad (1)$$

With the same origin, the above two groups of spectra may be obtained through two channels respectively, namely channels n and n+1. In an instance in which the input signal reaches the right-hand-side of the pilot analysis circuitry 700, a time delay may be the only difference they experience, as long as the mixers' IF bandwidth is large enough to accommodate a frequency range of $\omega \in [\omega_0/4, (M-\frac{3}{4})\omega_0]$. As a consequence, at the output side of the pilot analysis circuitry, their magnitudes may be identical to each other, and the phase difference between them may be linear with respect to frequency.

The two groups of data in (1) may be fed to a processor (e.g., processor 422), which may fuse the two groups of data. In this regard, the processor may be configured to construct the following list:

$$\begin{matrix} \angle A_{M-M_O+1}^{(n)} - \angle A_1^{(n+1)} \\ \angle A_{M-M_O+2}^{(n)} - \angle A_2^{(n+1)} \\ \vdots \\ \angle A_M^{(n)} - \angle A_{M_O}^{(n+1)} \end{matrix} \quad (2)$$

where operator "∠·" takes the phase of its argument. The processor may then use a linear function a+bω to fit the data in (2). In this regard, the processor may be configured to obtain unknowns a and b by minimizing the least square error between a+bω and the data in (2). When the least square error is calculated, the phase data in (2) may be weighed according to the corresponding magnitude data in (1). In one example, additional care may be taken in the curve fitting process as the phase may be 2π-periodic in that φ and φ+2π may be indistinguishable by the "∠·" operator.

In an instance in which the phase of either $\{A_1^{(n)}, A_2^{(n)}, \ldots, A_M^{(n)}\}$ or $\{A_1^{(n+1)}, A_2^{(n+1)}, \ldots, A_M^{(n+1)}\}$ is corrected (that is, subtracted or added) by a+bω, the outcomes of channels n and n+1 may be fused.

After the processor (e.g., processor 422) carries out the above for neighboring channels, the processor may be configured to "stitch" the narrow-band outcomes from the N channels into the entire frequency spectrum of the pilot signal. Notably, to reduce propagation of "stitching error" from channel to channel, the processor of one example may be configured to start with the two channels with the strongest spectral magnitudes. The processor may then be configured to conduct a complex conjugate operation on the spectral samples of P(t), and output results to control the power transmitter 418.

The pilot analysis circuitry 700 of FIG. 7 may be fairly flexible. Parameters such as N, M and $M_O$ may be adjusted by users to compromise various design constraints. In this regard, N may represent the "parallel complexity" (number of parallel channels), whereas M may represent the "serial complexity" (bandwidth of each channel). Large $M_O$ may improve the "stitching" accuracy but may also require more hardware/processing resources. It should also be noted that the pilot analysis circuitry need not include N physical oscillators and mixers. Instead, one physical "oscillator+mixer" may realize multiple IF channels via tuning the oscillator's frequency.

Figure 9:
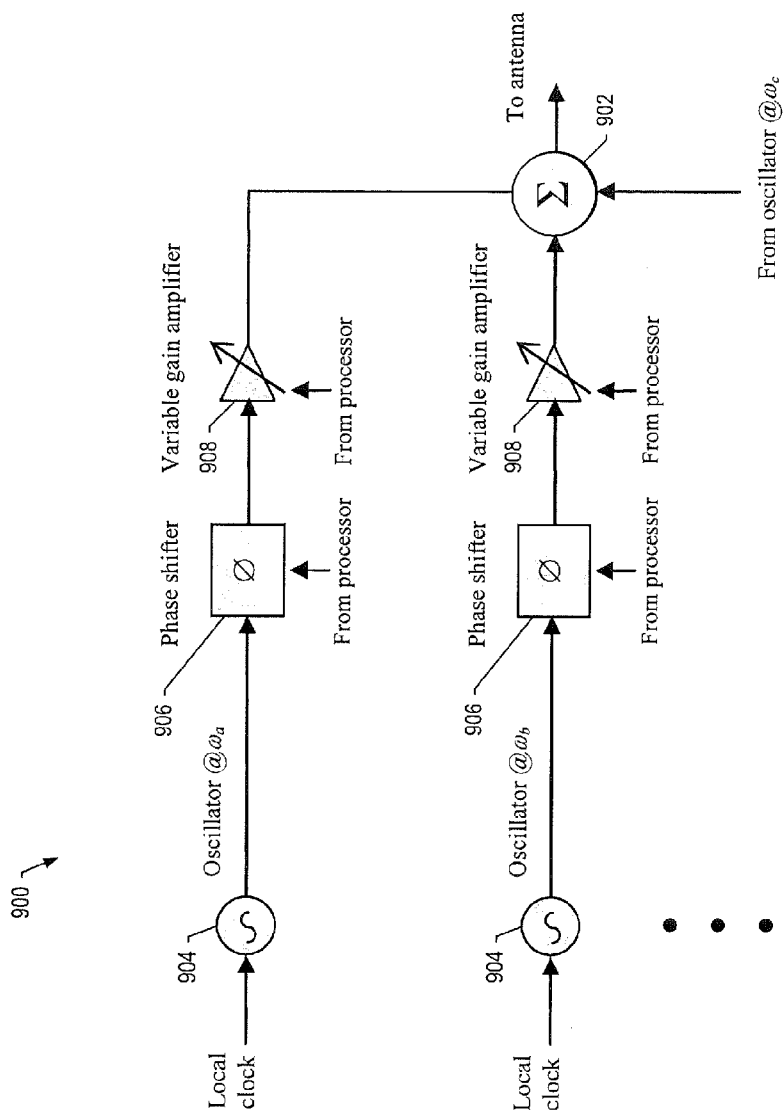
FIG. 9 illustrates a power transmitter according to one example embodiment.

FIG. 9 illustrates a power transmitter 900, which in one example may correspond to power transmitter 418. The power eventually delivered to an antenna element (e.g., antenna element 406) may be a sum 902 of multiple frequency carriers determined by oscillators 904 at frequencies $\omega_a, \omega_b, \omega_c, \ldots$. The multiple discrete frequencies $\{\omega_a, \omega_b, \omega_c, \ldots\}$ may coincide with the locations of some of the pilot signal's spectral lines, and may be pre-selected by specific applications of the system. The phase and amplitude of each oscillator's output may be controlled by a processor (e.g., processor 422) before it reaches the antenna. As shown in FIG. 9, the power transmitter may include phase shifters 906 and variable gain amplifiers 908 for respective ones of the oscillators, and which may provide phase control and amplitude control, respectively. Both phase and amplitude control may be determined by the output of pilot analysis circuitry (e.g, pilot analysis circuitry 416). In one example, the pilot analysis circuitry and power transmitter may share the same local clock reference such that the outcome of the pilot analysis circuitry may be reliably applied to control the power transmitter. For example, in an instance in which the pilot analysis circuitry outputs A for frequency $\omega_a$, the phase and amplitude at $\omega_a$ in the power transmitter may be tailored by the complex conjugate of A, namely conj(A).

Figure 10:
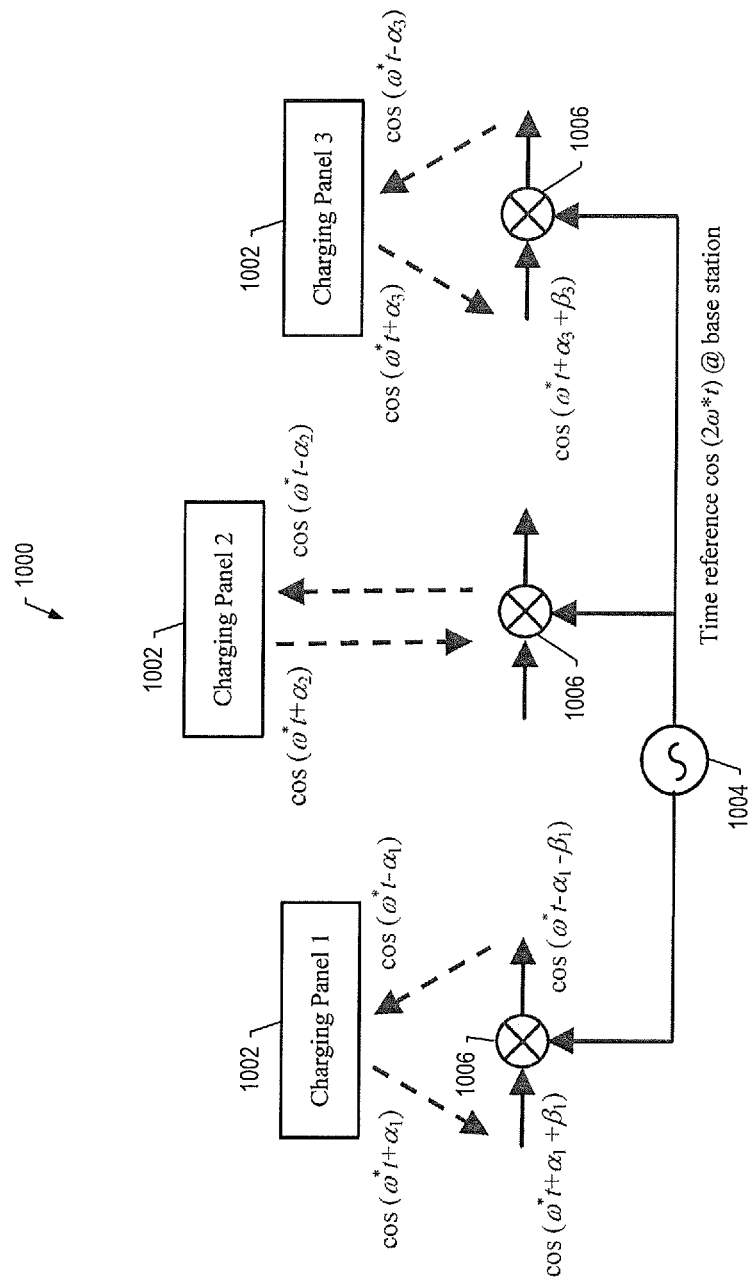
FIG. 10 illustrates a global synchronization scheme for a wireless charger, according to one example embodiment.

In the wireless charger (e.g., wireless charger 408), the oscillators may be coordinated/synchronized by one time reference; their frequencies may be locked by the same stable clock and their phases may be synchronized through a combination of local and global synchronization. Local synchronization may be among oscillators with various frequencies at individual charging panels. In one example, phase differences among oscillators at different frequencies may be recorded by phase detectors. FIG. 10 illustrates one example of a global synchronization scheme 1000 among a base station and plurality of charging panels 1002, which in one example may correspond to the base station 402 and charging panels 404 of FIG. 4. In one example, the global synchronization may be among a base station and plurality of charging panels, but only with respect to one frequency (denoted as ω*).

As shown in FIG. 10, an oscillator 1004 at double frequency 2ω* may be considered a master time reference. In one example, this oscillator may be physically located at the base station (e.g., base station 402). Each charging panel 1002 may have its own oscillator at frequency ω* but with different phases ($\alpha_i$, i=1, 2, 3, . . . ). When the local oscillators' signals propagate to the time reference, the phases may become $\alpha_i+\beta_i$, where $\beta_i$ represents the path between the i-th charging panel and base station. After being mixed with the double frequency time reference signal by respective mixers 1006, their phases may become $-\alpha_i-\beta_i$. The signals may then travel back to their respective charging panels, where their phases end up $-\alpha_i$. Values of a, may be easily obtained by comparing signals $cos(\omega^*t+\alpha_i)$ and $cos(\omega^*t-\alpha_i)$.

Figure 11:
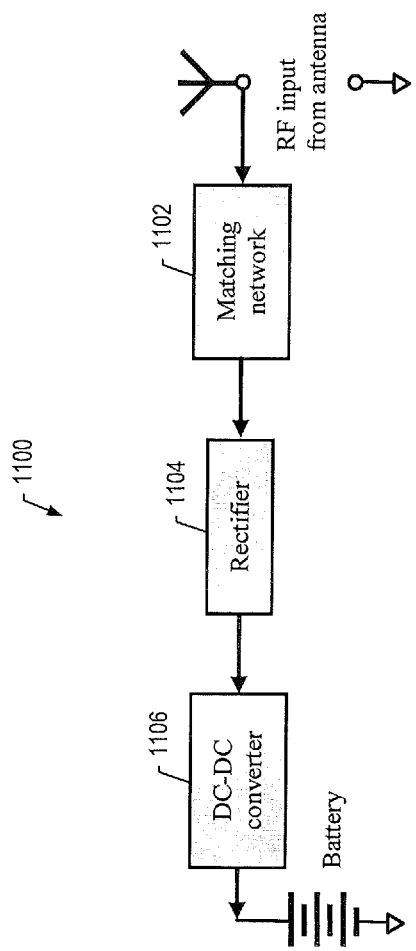
FIG. 11 illustrates an RF-DC converter according to one example embodiment.

Now turning back to the target device 410, RF power received by its antenna element 412 may be converted to DC by its RF-DC converter 428. FIG. 11 illustrates an RF-DC converter 1100, which according to one example embodiment may correspond to RF-DC converter 428. As shown, power received from the antenna element may first pass a matching network 1102, after which it may be rectified and filtered to DC such as by an appropriate rectifier 1104 and DC-DC converter 1106, respectively. The components downstream of the matching network including the rectifier and DC-DC converter may behave as a nonlinear load. The antenna may be expressed as an equivalent voltage source together with frequency-dependent internal impedance. In one example, the matching network may match the nonlinear load to the antenna in the "time domain" as opposed to the "frequency domain."

In one example, the matching network 1102 may be designed using feedback control theory and passive tunable components. The rectifier 1104 of one example may employ a diode-connected low-threshold voltage transistor, which may minimize dropout voltage that may otherwise occur in a typical full-wave rectifier architecture. Other suitable rectifier designs may include, for example, gate cross-coupled rectifiers, fully-coupled structures, bootstraps or the like. Finally, the DC-DC converter 1106 of one example may employ a DC-DC boost converter along with an input resonant bank. The resonant bank along with a biasing circuit may be configured to generate controllable and reliable gate signals to charge the battery (e.g., battery 432) of or otherwise provide power to the target device.

Returning to FIG. 4, as indicated above, the processors 422, 426 of the charging panel 404 and target device 410 may be configured to execute processing/control jobs. Each of the processors may include any of a number of different types of processing hardware, such as a microprocessor, coprocessor, controller or special-purpose integrated circuit or the like. Examples of a suitable special-purpose integrated circuit may include an application specific integrated circuit (ASIC), field programmable gate array (FPGA), digital signal processor (DSP), hardware accelerator, processing circuitry or the like.

In one example, the device processor 426 may be configured to perform only one function, namely to coordinate the different system modes (radar mode, communication mode, charging mode) to minimize the cost and power consumption of the target device 410. The charging panel processor, on the other hand, may be configured to perform more complex functions. In this regard, the charging panel processor may be configured to assist the pilot analysis circuitry 416 to analyze pilot signals, and in turn to control the power transmitter 418 to achieve beamforming. The charging panel processor may also be configured to use techniques such as time-of-arrival and matrix-pencil methods to determine whether any obstacles reside between any charging panel and the target device, and may be configured to deactivate the obstructed charging panel from power transmission.

Example embodiments may find use in a variety of potential applications, particularly in the consumer products industry to charge electronic devices such as laptops, cell phones, digital cameras, electric shavers or the like. Example embodiments may also find use in the medical industry to charge electronic devices implanted in the human body (or other bodies) such as camera capsules, pacemakers or the like. In these applications, the antenna elements transmitting wireless power may be physically attached and electrically matched to a large area of skin to couple the wireless power into the human body efficiently without harmful power build-up over the skin.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system configured to selectively operate in a number of modes including a radar mode and power-delivery mode, the system comprising:
   a plurality of spatially-distributed charging panels each of which includes a respective one or more antenna elements, the antenna elements of the charging panels forming an array of antenna elements,
   wherein the charging panels are configured to operate in the radar mode to receive a pilot signal from a powered device, and localize the powered device based thereon,
   wherein the charging panels are configured to operate in the power-delivery mode to cause radiation of a focused wireless power beam to the powered device, the charging panels being configured to cause radiation of the focused wireless power beam via the array of antenna elements configured to collaboratively radiate wireless power as a distributed, retro-reflective beamformer.

2. A charging panel configured to selectively operate in a number of modes including a radar mode and power-delivery mode, the charging panel comprising:
   a pilot analysis circuitry configured to operate in the radar mode to analyze the magnitude and phase of a pilot signal from a powered device;
   a processor coupled to the pilot analysis circuitry and configured to operate in the radar mode to determine a complex conjugate of the pilot signal based on the magnitude and phase; and
   a power transmitter coupled to the processor and configured to operate in the power-delivery mode to cause radiation of a focused wireless power beam to the powered device in accordance with the complex conjugate of the pilot signal, the power transmitter being configured to cause radiation of the focused wireless power beam via one or more antenna elements, wherein the charging panel is one of a plurality of spatially-distributed charging panels each of which includes a respective one or more antenna elements, the antenna elements of the charging panels forming an array of antenna elements configured to collaboratively radiate wireless power as a distributed, retro-reflective beamformer.

3. The charging panel of claim 2, wherein the number of modes further includes a communication mode, the charging panel being configured to switch from the radar mode to the power-delivery mode, and periodically switch from the power-delivery mode to the communication mode, wherein the charging panel is configured to operate in the communication mode to receive a charging request signal from the powered device after which the charging panel is configured to switch back to the radar mode in which the pilot analysis circuitry and processor are configured to again analyze and determine the complex conjugate of the pilot signal from the powered device, the charging panel being configured to then switch to the power-delivery mode in which the power transmitter is configured to cause radiation of a focused wireless power beam to the powered device in accordance with the complex conjugate of the pilot signal.

4. The charging panel of claim 2, wherein the processor or a base station coupled to the processor is configured to determine an instance in which a line-of-sight path between the one or more antenna elements and powered device is obstructed, and in response thereto, cause deactivation of the power transmitter.

5. The charging panel of claim 2, wherein the pilot analysis circuitry is configured to analyze the magnitude and phase of the pilot signal comprising an impulse train having a frequency spectrum covering multiple discrete frequencies.

6. The charging panel of claim 5, wherein the pilot analysis circuitry includes multiple parallel branches that are configured to down-convert the pilot signal to a plurality of intermediate-frequency (IF) channels and obtain respective portions of the frequency spectrum of the pilot signal therefrom, the portions of the frequency spectrum for every two adjacent channels partially overlapping one another.

7. The charging panel of claim 2, wherein the power transmitter is configured to cause radiation of the focused wireless power beam assigned to carriers at multiple discrete frequencies.

8. The charging panel of claim 7, wherein the power transmitter includes multiple oscillators at respective ones of the multiple discrete frequencies whose signals are phase shifted and amplified according to the complex conjugate of the pilot signal, and summed for radiation via the one or more antenna elements.

9. A method of selectively operating a system for wireless power transmission in a number of modes including a radar mode and power-delivery mode to deliver wireless power, the method comprising:

operating in the radar mode to analyze the magnitude and phase of a pilot signal from a powered device;

operating in the radar mode to determine a complex conjugate of the pilot signal based on the magnitude and phase; and operating in the power-delivery mode to cause radiation of a focused wireless power beam to the powered device in accordance with the complex conjugate of the pilot signal, radiation of the focused wireless power beam being via one or more antenna elements, wherein the wireless power is radiated via an array of spatially-distributed antenna elements configured to collaboratively radiate wireless power as a distributed, retro-reflective beamformer.

10. A charging panel comprising:

a pilot analysis circuitry configured to analyze the magnitude and phase of a pilot signal from a powered device, the pilot signal comprising an impulse train having a frequency spectrum covering multiple discrete frequencies, wherein the pilot analysis circuitry includes multiple parallel branches that are configured to down-convert the pilot signal to a plurality of intermediate-frequency (IF) channels and obtain respective portions of the frequency spectrum of the pilot signal therefrom, the portions of the frequency spectrum for every two adjacent channels partially overlapping one another;

a processor coupled to the pilot analysis circuitry and configured to determine a complex conjugate of the pilot signal based on the magnitude and phase; and a power transmitter coupled to the processor and configured to cause radiation of a focused wireless power beam to the powered device in accordance with the complex conjugate of the pilot signal, the power transmitter being configured to cause radiation of the focused wireless power beam via one or more antenna elements.

11. The charging panel of claim 10, wherein each branch of the pilot analysis circuitry comprises:

an oscillator and mixer configured to down-convert the pilot signal to a respective IF channel; and a number of band-pass filters each of which may capture a respective spectral line of a respective portion of the frequency spectrum of the impulse train.

12. The charging panel of claim 11, wherein the frequency spectrum of the impulse train includes spectral lines separated by a frequency $\omega_0$, and wherein the number of band-pass filters comprises M band-pass filters for each IF channel, the M band-pass filters being centered at respective ones of $(m-\frac{3}{4}) \times \omega_0$, m=1, 2, ..., M.

13. The charging panel of claim 12, wherein the oscillator has a frequency $\omega_0/4$ less than that of a first spectral line of the respective portion of the frequency spectrum of the impulse train.

14. The charging panel of claim 10, wherein the charging panel is one of a plurality of spatially-distributed charging panels each of which includes a respective one or more antenna elements, the antenna elements of the charging panels forming an array of antenna elements configured to collaboratively radiate wireless power as a distributed, retro-reflective beamformer.

15. The charging panel of claim 10, wherein the processor or a base station coupled to the processor is configured to determine an instance in which a line-of-sight path between the one or more antenna elements and powered device is obstructed, and in response thereto, cause deactivation of the power transmitter.

16. The charging panel of claim 10, wherein the power transmitter is configured to cause radiation of the focused wireless power beam assigned to carriers at multiple discrete frequencies.

17. The charging panel of claim 16, wherein the power transmitter includes multiple oscillators at respective ones of the multiple discrete frequencies whose signals are phase shifted and amplified according to the complex conjugate of the pilot signal, and summed for radiation via the one or more antenna elements.

18. A method of delivering wireless power comprising:
analyzing the magnitude and phase of a pilot signal from a powered device, the pilot signal comprising an impulse train having a frequency spectrum covering multiple discrete frequencies,
  wherein analyzing the magnitude and phase includes down-converting the pilot signal to a plurality of intermediate-frequency (IF) channels and obtaining respective portions of the frequency spectrum of the pilot signal therefrom, the portions of the frequency spectrum for every two adjacent channels partially overlapping one another;
determining a complex conjugate of the pilot signal based on the magnitude and phase; and
causing radiation of a focused wireless power beam to the powered device in accordance with the complex conjugate of the pilot signal, the wireless power being radiated via one or more antenna elements.

19. A powered device configured to selectively operate in a number of modes including a radar mode and power-delivery mode, the powered device comprising:
a transmitter configured to operate in the radar mode to cause transmission of a pilot signal to one or more of a plurality of spatially-distributed charging panels each of which includes a respective one or more antenna elements, the charging panels being configured to determine a complex conjugate of the pilot signal; and
an RF to direct current (RF-DC) converter configured to operate in the power-delivery mode to receive radiated wireless power from the one or more charging panels in accordance with the complex conjugate of the pilot signal, the antenna elements of the charging panels forming an array of antenna elements configured to collaboratively radiate the wireless power as a distributed, retro-reflective beamformer.

20. The powered device of claim 19, wherein the number of modes further includes a communication mode, the powered device being configured to switch from the radar mode to the power-delivery mode, and periodically switch from the power-delivery mode to the communication mode,
  wherein the powered device is configured to operate in the communication mode to cause transmission of a charging request signal to the one or more charging panels after which the powered device is configured to switch back to the radar mode in which the transmitter is configured to again cause transmission of the pilot signal to the one or more charging panels to determine the complex conjugate of the pilot signal, the powered device being configured to then switch to the power-delivery mode in which the RF-DC converter is configured to receive radiated wireless power in accordance with the complex conjugate of the pilot signal.

21. The powered device of claim 19, wherein the transmitter comprises an impulse transmitter configured to cause transmission of the pilot signal comprising an impulse train having a frequency spectrum covering multiple discrete frequencies.

22. The powered device of claim 19, wherein the RF-DC converter is configured to receive radiated wireless power assigned to carriers at multiple discrete frequencies.

23. A method of selectively operating a system for wireless power transmission in a number of modes including a radar mode and power-delivery mode to deliver wireless power, the method comprising:
operating in the radar mode to cause transmission of a pilot signal to one or more of a plurality of spatially-distributed charging panels each of which includes a respective one or more antenna elements, the charging panels being configured to determine a complex conjugate of the pilot signal; and
operating in the power-delivery mode to receive radiated wireless power from the one or more charging panels in accordance with the complex conjugate of the pilot signal, the antenna elements of the charging panels forming an array of antenna elements configured to collaboratively radiate the wireless power as a distributed, retro-reflective beamformer.

* * * * *

UNITED STATES PATENT AND TRADEMARK OFFICE
CERTIFICATE OF CORRECTION

| | | |
|---|---|---|
| PATENT NO. | : 9,030,161 B2 | Page 1 of 1 |
| APPLICATION NO. | : 13/534545 | |
| DATED | : May 12, 2015 | |
| INVENTOR(S) | : Mingyu Lu and Richard E. Billo | |

It is certified that error appears in the above-identified patent and that said Letters Patent is hereby corrected as shown below:

In the Claims

Column 16, line 54, Claim 1 delete "." and insert in its place --, and wherein the radar mode and the power-delivery mode are integrated.--.

Signed and Sealed this
Fifteenth Day of September, 2015

Michelle K. Lee
*Director of the United States Patent and Trademark Office*